No. 611,595. Patented Oct. 4, 1898.
E. M. ALDERSON.
BROILING AND TOASTING DEVICE.
(Application filed Nov. 30, 1897.)
(No Model.)
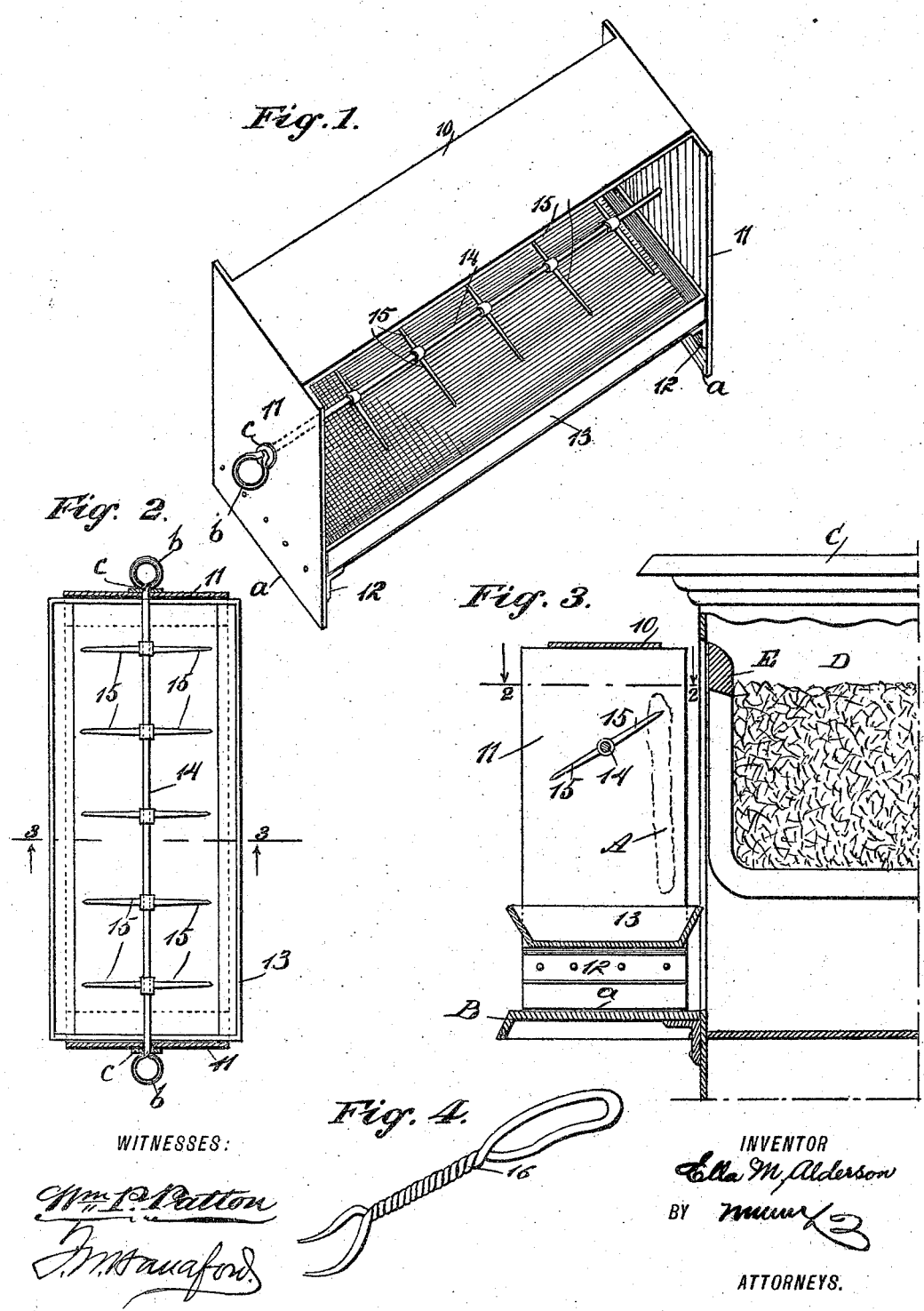
WITNESSES:
INVENTOR
Ella M. Alderson
BY
ATTORNEYS.

UNITED STATES PATENT OFFICE.

ELLA MAY ALDERSON, OF ASBURY, WEST VIRGINIA.

BROILING AND TOASTING DEVICE.

SPECIFICATION forming part of Letters Patent No. 611,595, dated October 4, 1898.

Application filed November 30, 1897. Serial No. 660,248. (No model.)

*To all whom it may concern:*

Be it known that I, ELLA MAY ALDERSON, of Asbury, in the county of Greenbrier and State of West Virginia, have invented new and useful Improvements in Broiling and Toasting Devices, of which the following is a full, clear, and exact description.

This invention relates to an improved device for broiling meat and toasting bread or the like, and has for its object to provide a novel simple device of the indicated character which will be very efficient in use, be convenient to operate, and be adapted for manufacture at a low cost.

The invention consists in the novel construction and combination of parts, as is hereinafter described, and indicated in the claims.

Reference is to be had to the accompanying drawings, forming a part of this specification, in which similar characters of reference indicate corresponding parts in all the figures.

Figure 1 is a perspective view of the improved broiler and toaster. Fig. 2 is a partly-sectional plan view substantially on the line 2 2 in Fig. 3. Fig. 3 is a sectional side elevation, on the line 3 3 in Fig. 2, of the improvement in position for service at a cooking-range, shown in part; and Fig. 4 is a perspective view of a fork, which is an adjunct of the broiler.

The improved broiling and toasting device is to be used in conjunction with the open fire of a cooking-range and expose meat or bread to heat-rays that radiate from the fire at the front of the grate, the device while in use being located upon the hearth of the stove or range.

In the drawings, which illustrate the construction and operation of the improvement, 10 indicates the top wall of the body or frame of the device, and 11 11 the end walls of the same.

Preferably the body of the broiler and toaster is formed of sheet metal and is of elongated essentially rectangular form.

The top piece 10 is flat and parallel on the side edges, having a suitable length for effective service. The end walls 11 are preferably formed integral with the top wall 10 and depend at right angles therefrom and may be of somewhat greater width than said top wall, as shown in Fig. 1. The end walls 11 are alike in dimensions and are rectangular in contour, so that their edges $a$, which are opposite the top piece 10, are parallel therewith and afford feet for the support of the complete device.

At a suitable and equal distance above the bottom edges $a$ angular bracket-shelves or ledges 12 are affixed upon the inner surfaces of the end walls 11. The ledges 12 afford support for the oblong dripping-pan 13, that has perpendicular end walls; but the side walls may be vertical from the bottom of the pan, as shown in Fig. 1, or be outwardly inclined, as shown in Fig. 3.

At a proper distance above the dripping-pan 13 a hanger-rod 14 is held by its ends in perforations in the walls 11, that may be at the transverse centers of said walls. Handles $b$, in ring form, are produced on the ends of the hanger-rod 14, and one of said handles is completely formed after the rod has been inserted in the opposite perforations of the end walls 11. It will be seen that if the ring-like handles $b$ are made to impinge upon the end walls 11 they will prevent an outward movement of said walls.

Washers $c$, of asbestos or other suitable material, may be strung upon the hanger-rod 14 and be interposed between the walls 11 and the handle-rings $b$, such a provision adding finish to the construction and also serving to prevent excessive heating of the handles $b$. It is to be understood, however, that the washers $c$ may be dispensed with, as they are not a feature of the invention.

At suitable distances apart on the hanger-rod 14 a plurality of similar carrier-fingers 15 are secured. Preferably the fingers 15 are projected oppositely from the hanger-rod, as best shown in Fig. 2, thereby providing two rows of fingers arranged at opposite sides of the hanger-rod 14. The fingers should be equal in length and so proportioned that meat may be hung on their pointed free ends, as indicated by dotted lines in Fig. 3, and depend therefrom inside the margin of the dripping-pan 13 when the latter is in place for service. The length of the pan 13 may be so proportioned that a proper frictional contact will be produced between the walls 11 and handles $b$, or between the washers $c$ and said handles if the washers are used.

It is essential that the hanger-rod 14 be held from too free a rotatable movement, as explained, or by any other means to adapt the carrier-fingers 15 to properly support meat or bread hung thereon.

When the device is to be put into use—say, for example, to broil a beefsteak (indicated by dotted lines at A in Fig. 3)—said slice of meat is placed on the fingers 15 so as to hang pendent therefrom and above the dripping-pan 13. The complete device is now seated upon the hearth B of a range or other cooking-stove C, having a fire-chamber D, the grate E of which is exposed to allow the radiation of heat from the fire in the chamber D by opening the front doors (not shown) of the range. It will be seen that the meat exposed to the radiant heat of the fire in the chamber D will be broiled, while freely exposed to the heated air that surrounds it, which is found to be an absolute essential for the wholesome and palatable culinary treatment of such articles of food. By a rocking movement of the hanger-rod 14 and its fingers 15, the meat while undergoing the broiling operation may be somewhat adjusted toward or from the fire, so as to graduate the effect of the hot air thereon, and thus properly broil the meat. While the steak or other meat is being broiled, the operator can freely view the process, the narrow top wall 10 and the open sides of the body permitting this, and the operator can also readily regulate the broiling to attain the most perfect results. If desired, the drippings in the pan 13 may be lifted with a spoon and applied as a dressing upon the meat while cooking.

In order to conveniently handle the hot meat, which must be reversed in position on the fingers 15 so as to broil both sides of the same, a fork is to be used, which may be in the form shown at 16 in Fig. 4 or be of any other design that is available.

The provision of two series of hanger-fingers 15, oppositely disposed on the rod 14, is of especial advantage in toasting bread, as the slices of bread may be arranged on each series of fingers and be successively brought near the fire by a half-revolution of the hanger-rod, the bread which has been toasted on one side being thus moved to the outer side of the device for changing to expose the opposite sides of the slices to heat, when another rotatable movement of the hanger-rod is effected.

It is apparent that this improved broiling and toasting device is very simple, durable, effective in use, and inexpensive to construct, and from its compact form occupies but little room when not in use.

Having thus described my invention, I claim as new and desire to secure by Letters Patent—

1. A broiler and toaster, comprising a body having a top wall and two end walls, a carrier-rod passing through said end walls, and having handles on the ends which frictionally engage these walls to prevent accidental rotation, and a series of spaced hanger-fingers on said hanger-rod, adapted to receive and hold material to be broiled or toasted by hanging said material on the pointed ends of the fingers, substantially as described.

2. A broiler and toaster, comprising a body having a top wall, and two end walls wider than said top wall, a hanger-rod passing through the end walls, and having handle-rings formed on its projecting ends, which prevent the end walls of the body from spreading, and two series of spaced hanger-fingers projecting oppositely in pairs from the hanger-rod, substantially as described.

3. A broiler and toaster, comprising a body having a top wall, two depending end walls formed integral with the top wall and having greater width than said wall, a hanger-rod passing through the end walls near their transverse centers and nearer the top wall than to the lower edges of the end walls, handle-rings on the ends of the hanger-rod, which rings hold the end walls from spreading, two series of hanger-fingers spaced apart on the hanger-rod, ledges affixed oppositely on the inner sides of the end walls below the hanger-rod, and a dripping-pan seated on the ledges, substantially as described.

ELLA MAY ALDERSON.

Witnesses:
JEAN B. MOFFETT,
SARAH R. JAMESON.